Patented July 21, 1942

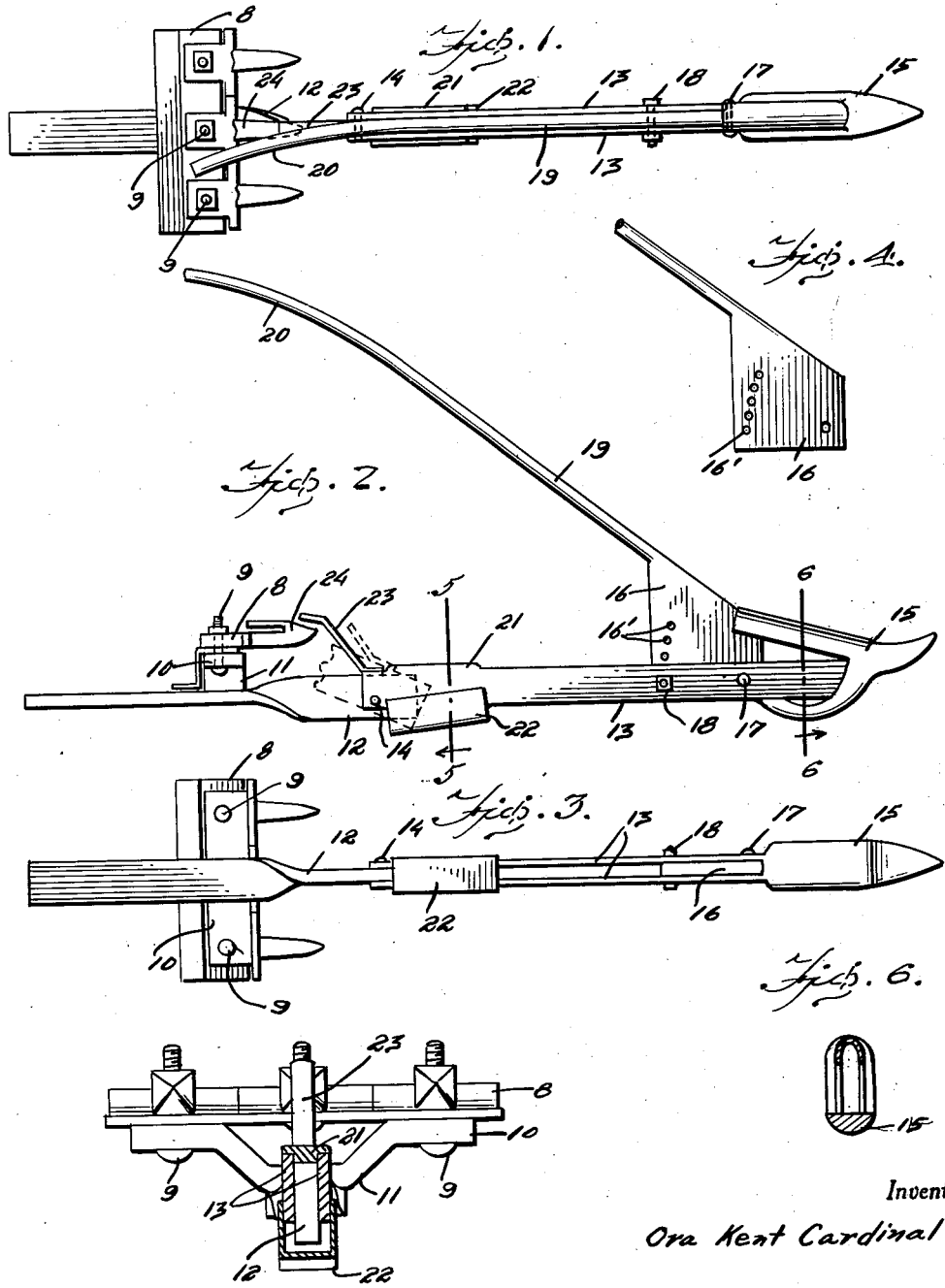

2,290,404

UNITED STATES PATENT OFFICE 2,290,404

PICKUP GUARD

Ora Kent Cardinal, Grand Meadow, Minn.

Application November 13, 1940, Serial No. 365,548

1 Claim. (Cl. 56—312)

The present invention relates to new and useful improvements in pickup guards, more particularly to a pickup guard attachment for a grain binder, and has for its primary object to provide, in a manner as hereinafter set forth, a device of this character which may be easily and quickly attached to a conventional grain binder.

Another object of the invention is to provide a pickup guard which will be adjustable.

Other objects are to provide the pickup guard which will be comparatively light in weight, highly efficient and reliable in use, and one which may be manufactured at comparatively low cost.

Still further objects and advantages of the invention will become apparent from a study of the following detailed description, taken in connection with the accompanying drawing, wherein like characters of reference designate corresponding parts throughout the several views, wherein:

Figure 1 is a top plan view of a device embodying my invention.

Figure 2 is a side elevational view of the invention.

Figure 3 is a bottom plan view of the invention.

Figure 4 is a fragmentary view in elevation of the guard arm.

Figure 5 is a transverse sectional view taken substantially on the line 5—5 of Figure 2, and Figure 6 is a transverse sectional view taken substantially on the line 6—6 of Figure 2.

Referring now to the drawing in detail, it will be seen that the reference numeral 8 designates a portion of a sickle bar of a conventional grain binder, to which my invention is attached.

Secured to the underside of the sickle bar 8 through the medium of bolts 9 is a plate 10, the mid portion of which is offset as at 11, and to which is attached the bar 12. An arm embodying a pair of bars 13 is pivotally secured to the bar 12 through the medium of a pin 14 in order that the bars 13 of said arm may ride up and down over a rough surface. The bars 13 are spacedly secured together and have attached, as by welding or otherwise, to their forward end portion a shoe 15.

A plate 16 is pivotally secured to and between the bars 13 through the medium of a rivet or pin 17 and is swingably adjustable between the bars 13 and held in adjusted position through the medium of a bolt 18 which passes through openings in the bars 13 and a selected opening of a series of openings 16' formed in the plate 16. An arm 19 extends upwardly and rearwardly from the plate 16 and terminates in a curved top end portion 20.

A plate 21 extends across the top edges of the bars 13 and is secured thereto shown in Figure 3 of the drawing. A channel shaped member 22 is welded or otherwise secured to the outside surfaces of the bars 13 adjacent the pivot 14 and extends below the bar 12 to provide a stop for engagement with the end of the bar 12 to limit the upward motion of the bars 13 when the same are swung upwardly.

The bar 12 has welded, or otherwise secured, to its front end portion a substantially Z-shaped finger 23 which extends upwardly and rearwardly to act as a supplemental guard for the finger guard 24 of the cutter bar 8.

From the foregoing it can readily be seen that the bars 13 carrying the guard arm 19 will travel over an uneven surface due to their pivotal connection with the arm 12 and thus elevate bean vines and position them for reception and severance by the cutter bar 8.

Although I have shown and described herein a preferred embodiment of my invention, it is to be definitely understood that I do not desire to limit the application of the invention thereto, and any change or changes may be made in the structure and arrangement of the several parts, within the spirit of the invention as claimed.

What is claimed is:

In a guard assembly for grain binders, a supporting bar, an arm pivoted at its rear end to the bar, a finger guard secured to the supporting bar and extending upwardly therefrom for overlying engagement with a finger guard of the binder, an elevator arm having a plate at its front end pivoted adjacent its front edge to the forward portion of the first named arm, and inter-engaging means on the first named arm and the plate adjacent the pivotal connection of the latter for adjustably securing the elevator arm at the desired angle of adjustment.

ORA KENT CARDINAL.